United States Patent Office 3,106,766
Patented Oct. 15, 1963

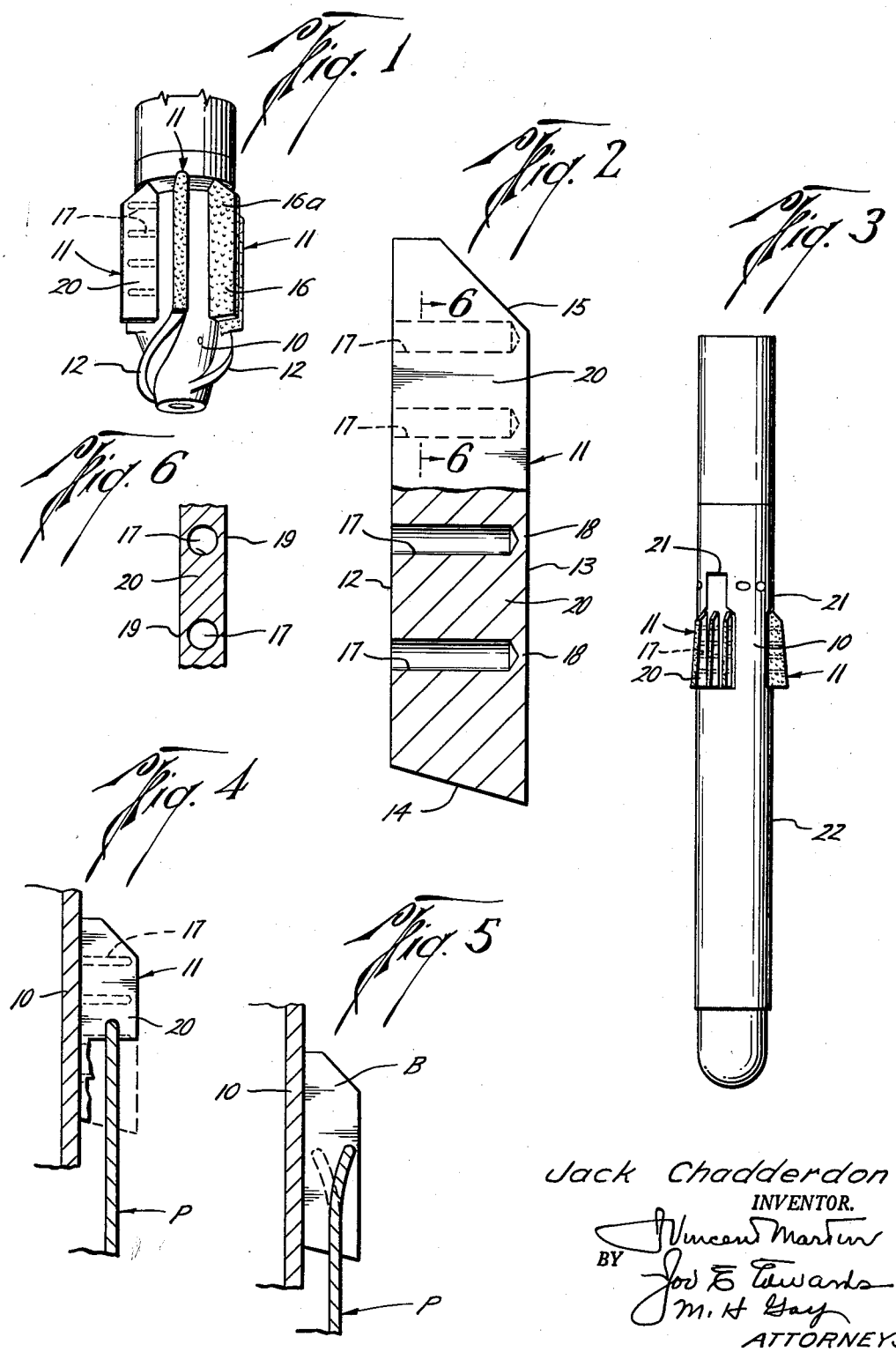

3,106,766
MILLING CUTTER BLADES
Jack Chadderdon, 5619 Fannin, Houston, Tex.
Filed Dec. 1, 1960, Ser. No. 73,037
2 Claims. (Cl. 29—103)

This invention relates to new and useful improvements in milling cutter blades. More particularly, it relates to an improvement upon the milling cutter blade disclosed in my prior Patent No. 2,846,193, issued August 5, 1958, "Milling Cutter for Use in Oil Wells."

My prior patent referred to above shows slots or slits provided for the purpose of dividing the blade into break-off segments, and generally this structure performs satisfactorily during the milling operation. However, because the slits must necessarily be narrow so as not to weaken the blade structure excessively and because such slits are open at their outer ends as well as on each side, the application of the cutting material welds the slots together.

This welding together or closing of the slots or slits interferes with the proper break-off of the segments. If the slots are made wider to prevent or reduce the possibility of such closing or pressing together, the blade will be too weak structurally to properly and efficiently perform the cutting operation.

One object of this invention is to provide an improved arrangement which overcomes the inherent disadvantages of the narrow slot structure of my prior patent.

An important object of this invention is to provide an improved milling cutter blade having openings or bores therein which are formed in such a manner that said openings may be made sufficiently large to assure that the segments of the blade break off at the proper time during the milling operation without unduly weakening the blade structure.

A further object is to provide a milling cutter blade in which a bore is formed entirely within the interior of the blade and which bore extends laterally into the blade from the inner edge thereof but which terminates short of the outer edge of the blade, whereby the open end of the bore, which is the weakest area of the blade, is adjacent the cutter body.

A still further object is to provide a cutter blade having spaced bores formed internally to provide weakened portions and which divide the blade into break-off segments, which blade is simple in construction and economical in manufacture.

This invention will be readily understood from a reading of the following detailed description and reference to the drawings wherein:

FIGURE 1 is a fragmentary perspective view of a form of the milling cutter with fixed external cutter teeth;

FIGURE 2 is an enlarged side elevational view of the improved milling cutter blade, partially in section;

FIGURE 3 is a side view of an expansible milling cutter with the milling teeth shown in their expanded position;

FIGURE 4 is a diagrammatic view illustrating a cutting blade as it mills the pipe with several of the blade segments broken away;

FIGURE 5 is a diagrammatic view illustrating the action of the end of the pipe being milled when no provision is made for the breaking away of the blade in segments;

FIGURE 6 is a fragmentary longitudinal sectional view along line 6—6 of FIGURE 2.

In the drawings (FIGURE 1) the numeral 10 designates the body of a milling tool to which longitudinally extending cutter blades 11 are secured in any suitable manner, as by welding or brazing. Each blade extends radially of the body and includes an inner longitudinal edge 12, an outer longitudinal edge 13 and a lower cutting edge 14. Preferably, the upper edge 15 of each blade is inclined or tapered inwardly. The blades 11 have a relatively narrow transverse thickness and merge into the pilot ribs 12 provided on the lower portion of the body 10; said ribs function to guide the cutter into the annular member or pipe which is to be milled.

The outer longitudinal edge 13 of each blade, as well as that side of the blade which faces in the direction of rotation of the cutter, are covered with a matrix 16 in which the cutting material 16a is embedded in the usual well-known manner. When the body 10 is lowered within the well bore, the lower cutting edge 14 of each blade is moved into contact with the upper end of the annular member or pipe which is to be milled. Upon rotation and imposition of weight upon the cutter, the upper end of the annular member or pipe is milled away.

As is fully explained in my prior Patent 2,846,193, difficulty has been experienced in milling annular members such as well pipe with a solid blade element. As shown in FIGURE 5, when the end of an annular pipe member indicated at P is milled with a solid blade, the end of the casing tends to flare outwardly or to swage inwardly as the end of the casing wears its way into the solid blade which is indicated at B. In either of these events, the friction between the pipe P and the blade B increases and the cutting action of said blade decreases until a point is reached where further cutting becomes impractical if not impossible. At this point the tool must be removed and the cutting blades replaced. It will thus be appreciated that when a solid blade B is employed, its useful longitudinal dimension is rather limited and only a comparatively short length of casing may be milled.

In my prior patent above referred to the problems involved in attempting to employ solid blades are solved by the provision of a plurality of spaced slots or slits which are formed in the blade itself. As shown in such prior patent, each slot extends from the outer longitudinal edge of the blade and inwardly thereof. The purpose of the slots shown in my prior patent is to assure that various segments of the blade will break off as the end of the pipe or annular member being milled wears its way longitudinally into the material of the blade. However, in order to give the blade sufficient strength, the slots shown in my prior patent must necessarily be of relatively narrow width, and when of such narrow width the application of the cutting material welds the slots together, with the result that the segments do not break off at the proper time. Although satisfactory in most instances, difficulty has been experienced with the particular structure shown in the prior patent.

To overcome the disadvantages of the type of slots or slits illustrated in such prior patent, each of the cutter blades herein is provided with weakened portions which are formed by a plurality of bores or openings 17. The openings 17 are drilled into the body of the blade and extend from the inner longitudinal edge 12, terminating short of the outer longitudinal edge 13 whereby an area of material indicated at 18 in FIGURE 2 is not removed. Thus, the open end of the bore 17 is adjacent to, and reinforced by, the body structure 10. As the transverse dimension of the blade 11 is greater than the diameter of the bore 17, the material surrounding each opening, which material is indicated at 19 in FIGURE 6, remains in place and is not removed by the drilling of each bore. It is evident that the spaced bores or openings 17 divide the blade into a plurality of break-away segments 20.

The bores or openings 17 may be quickly and easily formed by a simple drilling operation, and the size of said openings may be considerably enlarged as compared to the provision of a transverse or lateral slot shown in my prior patent. The openings or bores 17 may be made larger because the material 19 surrounding the openings, as well as the material 18 at the end of said opening, provides for connecting the break-away segments to each other although with a weakened wall section. Of course the wall section 18 at the outer end of each opening is reinforced and braced by the provision of the matrix 16 in which the cutting material 16a is embedded.

In operation, the milling tool is employed in the well-known manner with the lower cutting edges 14 of the blades being engaged with the annular member or pipe to be milled. During such milling operation, the imposition of weight will not tend to collapse the openings 17, as it would if the transverse slots of my prior patent were employed. Therefore, during the actual milling operation, the blade has sufficient strength to operate effectively, and yet as soon as the end of the annular member or pipe moves into one of the openings it will immediately result in breaking away the lower section of the blade. The force required to separate the blade material by fracturing the wall sections 18 and 19 is created by the frictional engagement or binding between the pipe member P and the blade itself, this force increasing as the annular member moves progressively further into the blade. Thus, as shown in FIGURE 4, the segments 20 break away from the blade as the milling operation continues and the end of the pipe P wears into the blade 11.

In the embodiment shown in FIGURE 3, the cutter blades 11 are of a different shape in diminishing in radial width toward their upper end. Instead of being attached directly to the tool body structure 10, the blades 11 are secured to a set of expansible cutter arms 21 which are journalled transversely at their upper ends in the body structure 10. The operation of these expansible cutter arms, disclosed in my copending application Serial No. 632,931, filed January 7, 1957, issued as Patent No. 2,859,943 for "Expansible Mill for Well Casing," and my Patent 2,846,193, is not involved in the present invention. In the manner discussed above, the matrix 16, in which the cutting material 16a is embedded, preferably covers the outer longitudinal edge 13 and the leading side of the blades 11. The tubular portion 22 below the cutter blades 11 guides the entire tool into the annular member to be milled. The bores 17 are formed in the blades 11 in the manner discussed above, and these bores serve the purpose of dividing the blade 11 into several breakaway segments 20. It is apparent that the blades 11, though somewhat different, function in the manner discussed above.

The foregoing disclosure and description of the invention is illustrative and explanatory thereof, and various changes in the size, shape and materials, as well as in the details of the illustrated construction, may be made within the scope of the appended claims without departing from the spirit of the invention.

I claim:
1. A milling cutter for use in well bores comprising, a body structure,
a plurality of longitudinally extending cutter blades projecting in a substantially radial direction from said body structure and spaced at radial positions around said body structure,
each of said cutter blades being divided transversely into a plurality of segments by a plurality of lateral openings,
each of said openings extending from the inner longitudinal edge of said blade and terminating adjacent and spaced inwardly from the outer longitudinal edge of said blade,
each of said openings being circular in cross section and having a diameter less than the transverse dimension of said cutter blade whereby the outer surface of the blades is uninterrupted to form the connection between said segments,
each of said cutter blades being thereby capable of wearing away when subject to attrition to expose succeeding segments.
2. A milling cutter comprising,
a support member arranged for rotation about a longitudinal axis,
a longitudinally extending composite cutter blade projecting in a substantially radial direction from said support member said cutter blade consisting of a rib core portion and a matrix portion, said matrix portion being bonded to and supported by the rib core portion, said matrix containing a plurality of embedded cemented carbide cutting particles, said rib core portion having an outer longitudinal surface in the region where the matrix portion is bonded thereto,
said cutter blade being divided transversely into a plurality of segments by at least one lateral opening which extends into the rib core portion from a longitudinal inner surface of said cutter blade opposed to said outer surface to a point adjacent but spaced inwardly from said outer longitudinal surface, so that said opening does not extend through said outer longitudinal surface,
said opening being enclosed within said core except at said inner surface,
said cutter blade being thereby capable of wearing away when subjected to attrition to expose succeeding segments.

References Cited in the file of this patent

UNITED STATES PATENTS

| | | |
|---|---|---|
| 2,104,604 | Bartek | Jan. 4, 1938 |
| 2,256,847 | Osenberg | Sept. 23, 1941 |
| 2,846,193 | Chadderdon | Aug. 5, 1958 |